United States Patent
Kim et al.

(10) Patent No.: US 10,944,084 B2
(45) Date of Patent: Mar. 9, 2021

(54) SECONDARY BATTERY AND METHOD FOR SUPPLEMENTING ELECTROLYTE OF SECONDARY BATTERY

(71) Applicant: LG Chem, Ltd., Seoul (KR)

(72) Inventors: Dae Soo Kim, Daejeon (KR); Han Young Lee, Daejeon (KR)

(73) Assignee: LG Chem, Ltd.

( * ) Notice: Subject to any disclaimer, the term of this patent is extended or adjusted under 35 U.S.C. 154(b) by 204 days.

(21) Appl. No.: 16/067,952

(22) PCT Filed: Jul. 26, 2017

(86) PCT No.: PCT/KR2017/008069
§ 371 (c)(1),
(2) Date: Jul. 3, 2018

(87) PCT Pub. No.: WO2018/038409
PCT Pub. Date: Mar. 1, 2018

(65) Prior Publication Data
US 2020/0127248 A1  Apr. 23, 2020

(30) Foreign Application Priority Data
Aug. 26, 2016  (KR) .................... 10-2016-0109485

(51) Int. Cl.
*H01M 2/08* (2006.01)
*H01M 2/36* (2006.01)
*H01M 10/6551* (2014.01)

(52) U.S. Cl.
CPC ............ *H01M 2/08* (2013.01); *H01M 2/36* (2013.01); *H01M 2/365* (2013.01); *H01M 10/6551* (2015.04); *Y02E 60/10* (2013.01)

(58) Field of Classification Search
None
See application file for complete search history.

(56) References Cited

U.S. PATENT DOCUMENTS

2003/0091889 A1* 5/2003 Sotomura ............ H01M 12/06
429/405
2004/0099305 A1* 5/2004 Heller ................. H01L 51/5203
136/263

(Continued)

FOREIGN PATENT DOCUMENTS

CN  101533927 A  9/2009
CN  102044641 A  5/2011

(Continued)

OTHER PUBLICATIONS

International Search Report From PCT/KR2017/008069 dated Nov. 6, 2017.

(Continued)

*Primary Examiner* — Jonathan Crepeau
(74) *Attorney, Agent, or Firm* — Lerner, David, Littenberg, Krumholz & Mentlik, LLP

(57) ABSTRACT

The present invention relates to a secondary battery and a method for supplementing an electrolyte of the secondary battery. The secondary battery according to the present invention comprises a battery case comprising an accommodation part accommodating an electrode and an electrolyte therein and a sealing member for additionally injecting the electrolyte, which is disposed on a portion of the battery case to additionally inject the electrolyte into the accommodation part of the battery case and seals an injection portion.

11 Claims, 10 Drawing Sheets

(56) References Cited

U.S. PATENT DOCUMENTS

| | | | |
|---|---|---|---|
| 2008/0070101 A1 | 3/2008 | Barrella | |
| 2011/0052978 A1 | 3/2011 | Lee et al. | |
| 2011/0091765 A1 | 4/2011 | Kim | |
| 2011/0108134 A1 | 5/2011 | Nishimura et al. | |
| 2011/0171503 A1 | 7/2011 | Giroud et al. | |
| 2011/0300437 A1 | 12/2011 | Yi | |
| 2013/0202927 A1 | 8/2013 | Kim et al. | |
| 2016/0020436 A1* | 1/2016 | Laulicht | H01M 2/34 429/246 |
| 2016/0020452 A1 | 1/2016 | Choi et al. | |
| 2016/0087304 A1 | 3/2016 | Tsukui | |
| 2018/0115012 A1 | 4/2018 | Locke et al. | |

FOREIGN PATENT DOCUMENTS

| | | |
|---|---|---|
| CN | 102044715 A | 5/2011 |
| CN | 102171853 A | 8/2011 |
| CN | 102270757 A | 12/2011 |
| CN | 103050728 A | 4/2013 |
| CN | 103119748 A | 5/2013 |
| CN | 103915599 A | 7/2014 |
| CN | 204216160 U | 3/2015 |
| CN | 204809307 U | 11/2015 |
| CN | 105122531 A | 12/2015 |
| CN | 205264792 U | 5/2016 |
| JP | H09199108 A | 7/1997 |
| JP | 20037357 A | 1/2003 |
| JP | 4015826 B2 | 11/2007 |
| JP | 2008-041548 A | 2/2008 |
| JP | 2011253797 A | 12/2011 |
| JP | 2012504303 A | 2/2012 |
| JP | 2015130310 A | 7/2015 |
| JP | 2018524790 A | 8/2018 |
| KR | 20070067779 A | 6/2007 |
| KR | 10-0779002 B1 | 11/2007 |
| KR | 2011-0132856 A | 12/2011 |
| KR | 20120069297 A | 6/2012 |
| KR | 20130000364 A | 1/2013 |
| KR | 2014-0015647 A | 2/2014 |
| KR | 10-1379691 B1 | 4/2014 |
| KR | 2016-0077663 A | 7/2016 |
| WO | 2016198145 A1 | 12/2016 |

OTHER PUBLICATIONS

Extended European Search Report including Written Opinion for Application No. EP17843829.7 dated Oct. 11, 2018.
Chinese Search Report for Application No. 201780008799.0 dated Jun. 30, 2020, 3 pages.

* cited by examiner

SECONDARY BATTERY AND METHOD FOR SUPPLEMENTING ELECTROLYTE OF SECONDARY BATTERY

CROSS-REFERENCE TO RELATED APPLICATION

This application is a national phase entry under 35 U.S.C. § 371 of International Application No. PCT/KR2017/008069, filed Jul. 26, 2017, which claims priority to Korean Patent Application No. 10-2016-0109485, filed Aug. 26, 2016, the disclosures of which are hereby incorporated herein by reference.

TECHNICAL FIELD

The present invention relates to a secondary battery and a method for supplementing an electrolyte of the secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

DISCLOSURE OF THE INVENTION

Technical Problem

One aspect of the prevent invention is to provide a secondary battery in which an electrolyte is capable of being additionally injected and which is resealed after the injection of the electrolyte and a method for supplementing the electrolyte of the secondary battery.

Technical Solution

A secondary battery according to an embodiment of the present invention may comprise a battery case comprising an accommodation part accommodating an electrode and an electrolyte therein and a sealing member for additionally injecting the electrolyte, which is disposed on a portion of the battery case to additionally inject the electrolyte into the accommodation part of the battery case and seals an injection portion, wherein the sealing member for additionally injecting the electrolyte passes through the inside and outside of the battery case so that the electrolyte is injected through a penetrated portion of the sealing member.

A method for supplementing an electrolyte of a secondary battery according to an embodiment of the present invention may comprise an injection preparation process of allowing an injection needle to pass through a sealing member for additionally injecting the electrolyte, which passes through the inside and outside of a battery case and is formed on a portion of the battery case so that the injection needle passes through a penetrated portion of the sealing member to inject the electrolyte, an injection process of additionally injecting the electrolyte into an accommodation part of the battery case, in which an electrode assembly and the electrolyte are accommodated, through the injection needle, and a sealing process of sealing the portion of the sealing member, through which the injection needle passes, after the injection needle is removed from the sealing member for additionally injecting the electrolyte.

Advantageous Effects

According to the present invention, the sealing member for additionally injecting the electrolyte may be disposed on a portion of the battery case to additionally inject the electrolyte into the battery. After the electrolyte is injected, the sealing member may be resealed.

Also, the sealing member for additionally injecting the electrolyte may be made of the thermoplastic member. Thus, when heat is applied, the sealing member may have fluidity so that the needle for injecting the electrolyte easily passes through the sealing member. When heat is applied after the injection needle is removed, the portion of the sealing member, through which the needle passes, may be easily sealed. Here, the thermoplastic member may be made of the silicone sealant. Thus, even when the thermal treating process is performed, the sealing member for additionally injecting the electrolyte may be minimized in material damage thereof. Thus, the repetitive and additional supplement of the electrolyte may be easy.

Also, the sealing member for additionally injecting the electrolyte may be provided as the highly contractive member to seal the penetrated portion by the self-contacting force thereof when the injection needle is removed, thereby sealing the sealing member for additionally injecting the electrolyte without performing separate sealing processing.

MODE FOR CARRYING OUT THE INVENTION

Figure 1:
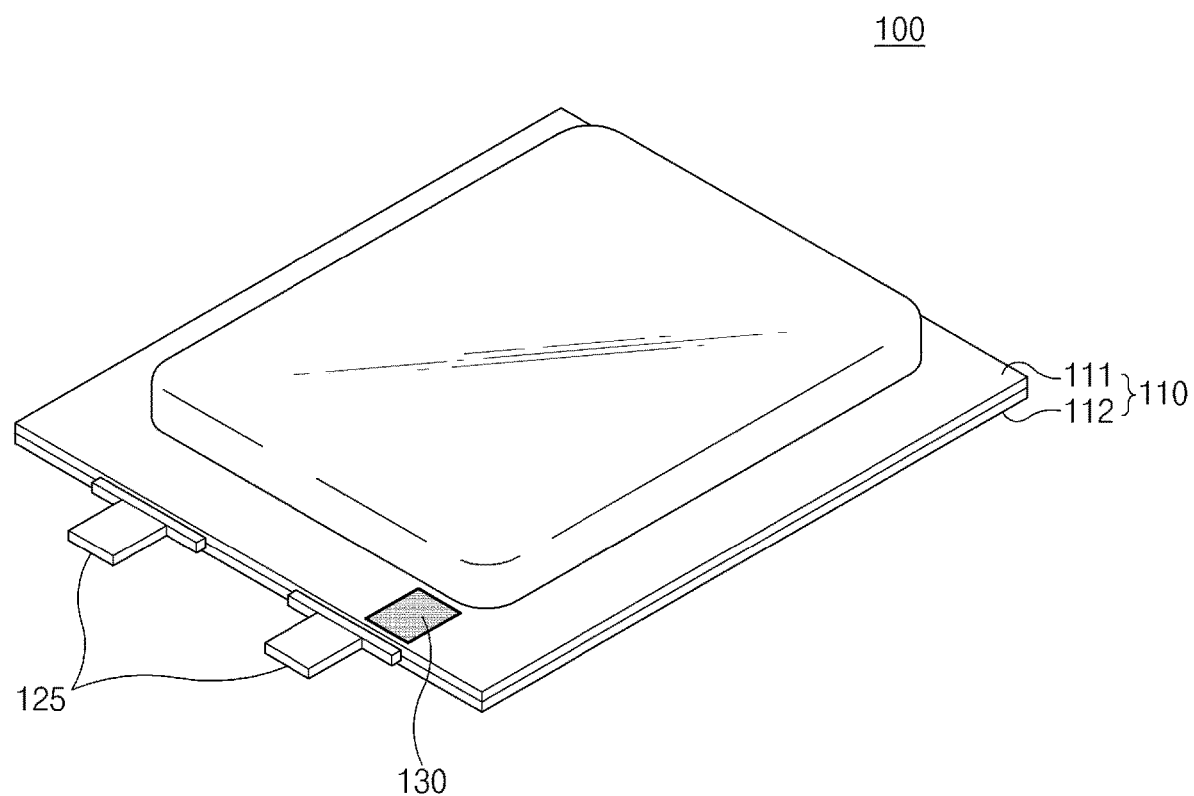
FIG. 1 is a perspective view of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
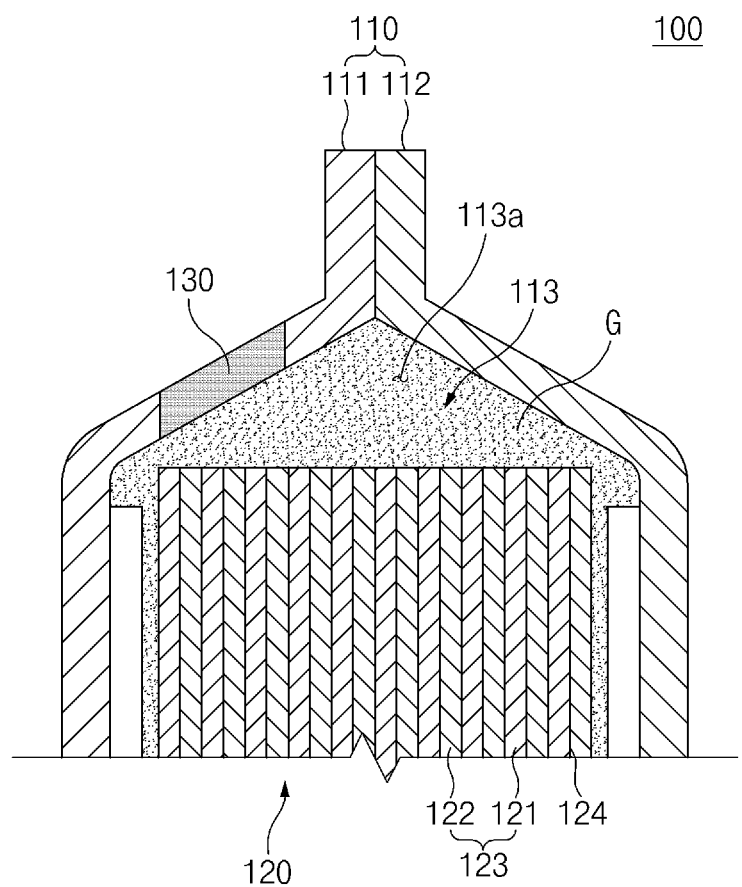
FIG. 2 is a cross-sectional view illustrating a main part of the secondary battery according to the first embodiment of the present invention.

FIG. 1 is a perspective view of a secondary battery according to a first embodiment of the present invention, and FIG. 2 is a cross-sectional view illustrating a main part of the secondary battery according to the first embodiment of the present invention.

Referring to FIGS. 1 and 2, a secondary battery 100 according to a first embodiment of the present invention comprises a battery case 110 accommodating an electrode assembly 120 and an electrolyte G and a sealing member 130 for additionally injecting the electrolyte G, which is disposed on a portion of the battery case 110.

Hereinafter, the secondary battery according to the first embodiment of the present invention will be described in more detail with reference to FIGS. 1 and 2.

The battery case 110 comprises a first case 111 and a second case 112 and also comprises an accommodation part 113 accommodating the electrode assembly 120 and the electrolyte G therein. Here, the battery case 110 has a space part 113a in which the electrode assembly 120 is not disposed in the accommodation part 120. Here, the space part 113a is formed in the battery case 110 so that the sealing member 130 for additionally injecting the electrolyte G is adjacent to the space part 113a.

The electrode assembly 120 may be a chargeable and dischargeable power generation element and have a structure in which an electrode 123 and a separator 124 are combined and alternately stacked. Also, the electrode assembly 120 may comprise an electrode lead 125 electrically connected to the electrode 123.

The electrode 123 may comprise a positive electrode 121 and a negative electrode 122. Here, the electrode assembly 120 may have a structure in which the positive electrode 121/the separator 124/the negative electrode 122 are alternately stacked.

The separator 124 is made of an insulation material to electrically insulate the positive electrode 121 from the negative electrode 122. Here, the separator 124 may be made of, for example, a polyolefin-based resin film such as polyethylene or polypropylene having micropores.

The sealing member 130 for additionally injecting the electrolyte G may be disposed on a portion of the battery case 110 so that an injection portion of the battery case 110 is sealed after the electrolyte G is additionally injected into the accommodation part 113 of the battery case 110.

Also, the sealing member 130 for additionally injecting the electrolyte G may be provided to pass through the inside and outside of the battery case 110 so that a portion of the sealing member 130 is penetrated for injecting the electrolyte G.

Furthermore, the sealing member 130 for additionally injecting the electrolyte G may be made of a thermoplastic member. Thus, when heat is applied, the sealing member may have fluidity so that an injection needle easily passes through the sealing member. When heat is applied after the injection needle is removed, the injection portion having a through-hole, through which the injection needle passes, may be easily sealed.

Here, the thermoplastic member may be made of, for example, a silicone sealant. Thus, when heat is applied to the sealing member 130 for additionally injecting the electrolyte G, the fluidity may be more improved so that the injection need more easily passes through the sealing member 130. Also, although the thermal treating process is repeatedly performed, the material damage of the sealing member 130 for additionally injecting the electrolyte G may be minimized. In addition, when the injection needle is removed after heat is applied to allow the injection needle to pass, and then heat is applied again, the injection portion may return to its original shape. That is, when the heat is applied to the penetrated portion of the sealing member 130 for additionally injecting the electrolyte G while the injection is performed, the penetrated portion may be filled to completely seal the injection portion.

Figure 3:
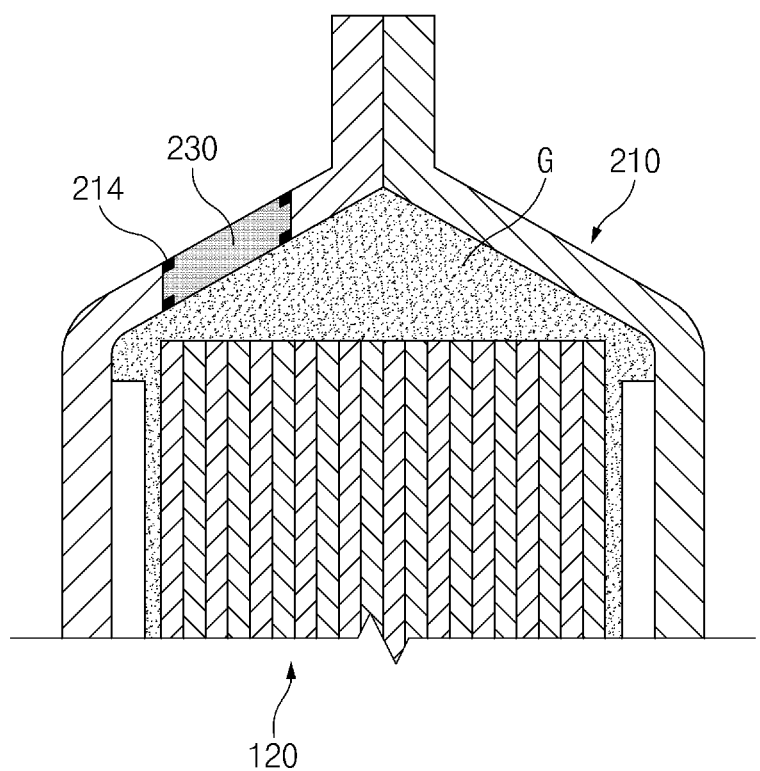
FIG. 3 is a cross-sectional view illustrating a main part of a secondary battery according to a second embodiment of the present invention.

FIG. 3 is a cross-sectional view illustrating a main part of a secondary battery according to a second embodiment of the present invention.

Referring to FIG. 3, a secondary battery 200 according to another embodiment of the present invention further comprises a protrusion end 214 on a battery case 210 to support the sealing member 230 for additionally injecting the electrolyte G, thereby preventing the sealing member 230 from being separated from the battery case 210.

Here, the protrusion end 214 protrudes from each of inner and outer surfaces of the battery case 210 in a direction of the sealing member 230 for additionally injecting the electrolyte G to support the sealing member 230 for additionally injecting the electrolyte G, thereby preventing the sealing member 230 from being separated toward the inside and outside of the battery case 210. Here, for example, the protrusion end 214 may protrude to be disposed along an edge of each of upper and lower end of the sealing member 230 for additionally injecting the electrolyte G.

Figure 4:
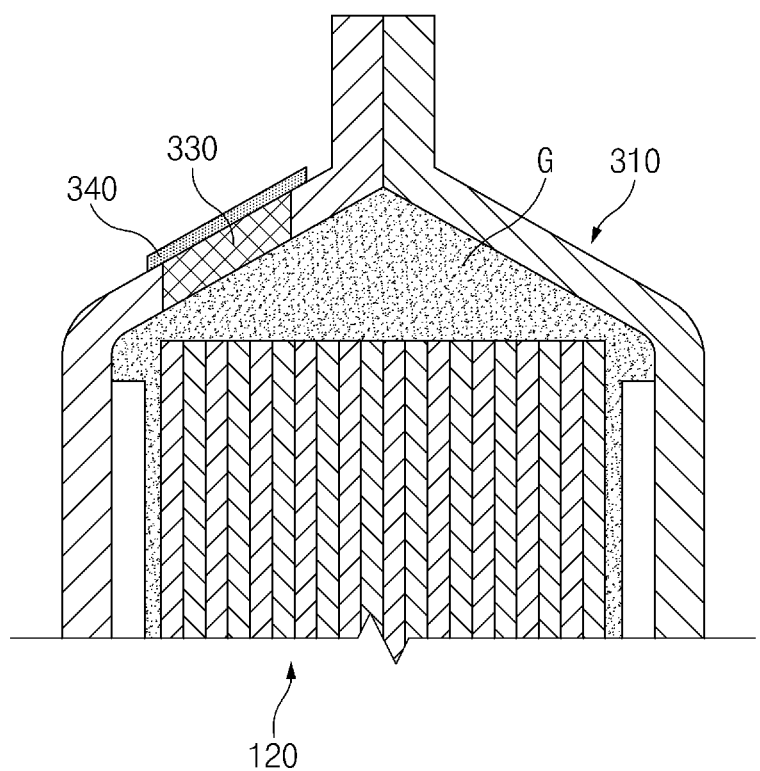
FIG. 4 is a cross-sectional view illustrating a main part of a secondary battery according to a third embodiment of the present invention.

FIG. 4 is a cross-sectional view illustrating a main part of a secondary battery according to a third embodiment of the present invention.

Referring to FIG. 4, a secondary battery 300 according to a third embodiment of the present invention comprises a battery case 310 accommodating an electrode assembly 120 and an electrolyte G, a sealing member 330 for additionally injecting the electrolyte G, which is disposed on a portion of the battery case 310, and a sealing tape 340 attached to the sealing member 330 for additionally injecting the electrolyte G.

The secondary battery 300 according to the third embodiment of the present invention is different from the secondary battery 100 according to the first embodiment and the secondary battery 200 according to the second embodiment in that the sealing member 330 for additionally injecting the electrolyte G is provided as a highly contractive member to allow the sealing tape 340 to the sealing member 330 for additionally injecting the electrolyte G. Thus, contents of this embodiment, which are duplicated with those according to the first and second embodiments, will be briefly described, and also, differences therebetween will be mainly described.

In more detail, the sealing member 330 for additionally injecting the electrolyte G may be provided as the highly contractive member, and thus an injection portion may be sealed by self-contracting force thereof. Here, the highly contractive member may be made of, for example, silicone rubber.

Also, the sealing tape 340 may be attached to an outer surface of the sealing member 330 for additionally injecting the electrolyte G to additionally seal the injection portion. Here, the sealing tape 340 may be provided as, for example, Kapton tape. Here, the Kapton tape may be excellent in heat resistance, cold resistance, chemical resistance, insulation, withstand voltage, and the like to improve sealability, thereby protecting the sealing member 330 for additionally injecting the electrolyte G against various environments.

Figure 5:
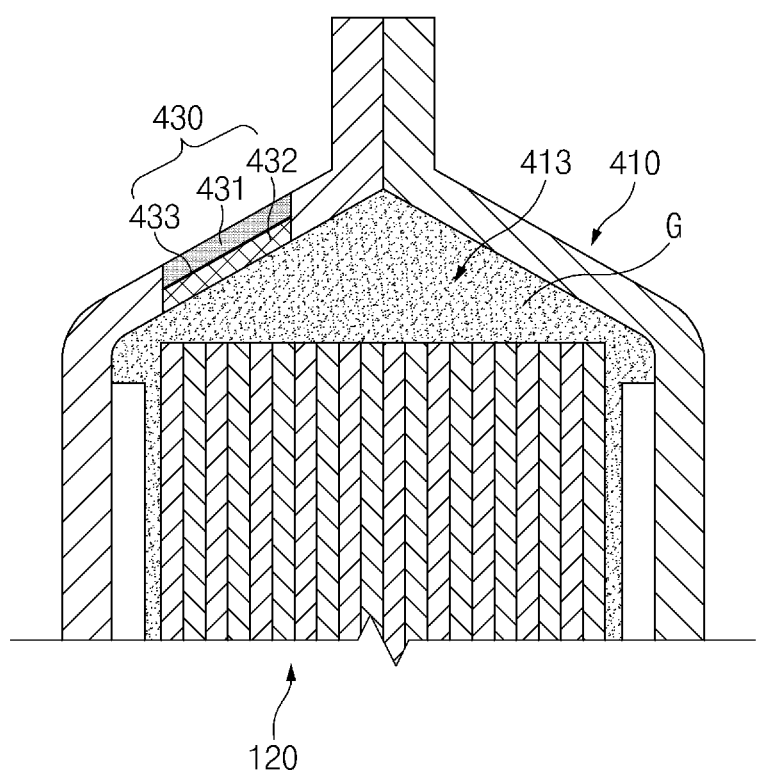
FIG. 5 is a cross-sectional view illustrating a main part of a secondary battery according to a fourth embodiment of the present invention.

FIG. 5 is a cross-sectional view illustrating a main part of a secondary battery according to a fourth embodiment of the present invention.

Referring to FIG. 5, a secondary battery 400 according to a fourth embodiment of the present invention comprises a battery case 410 accommodating an electrode assembly 120 and an electrolyte G and a sealing member 430 for additionally injecting the electrolyte G, which is disposed on a portion of the battery case 410. Here, in the secondary battery 400 according to the fourth embodiment of the present invention, the sealing member 430 for additionally injecting the electrolyte G may comprise a thermoplastic member, a highly contractive member, a heat dissipation member 433.

The secondary battery 300 according to the third embodiment of the present invention is different from the secondary battery 100 according to the first embodiment, the secondary battery 200 according to the second embodiment, and the secondary battery 300 according to the third embodiment in that the sealing member 430 for additionally injecting the electrolyte G comprises the thermoplastic member, the highly contractive member, the heat dissipation member 433. Thus, contents of this embodiment, which are duplicated with those according to the first, second, and third embodiments, will be briefly described, and also, differences therebetween will be mainly described.

In more detail, in the sealing member 430 for additionally injecting the electrolyte, an outer part 431 of the sealing member 430 with respect to an accommodation part of the battery case 410 may be provided as the thermoplastic member to seal the injection portion by applying heat. Also, the inner part 432 of the sealing member 430 may be provided as the highly contractive member to seal the injection portion by self-contracting force thereof. Here, the thermoplastic member may be made of a silicone sealant, and the highly contractive member may be made of silicone rubber. Thus, the injection portion of the sealing member 430 for additionally injecting the electrolyte G may be doubly sealed to provide more sealing force.

Also, the sealing member 430 for additionally injecting the electrolyte G may further comprise the heat dissipation member 433 disposed between an outer part 431 and an inner part 432 to block heat transfer between the outer part 431 and the inner part 432. Here, the heat dissipation member 433 may be made of a Kapton material. Here, the heat dissipation member 433 may be provided as, for example, a Kapton tape.

Figure 6:
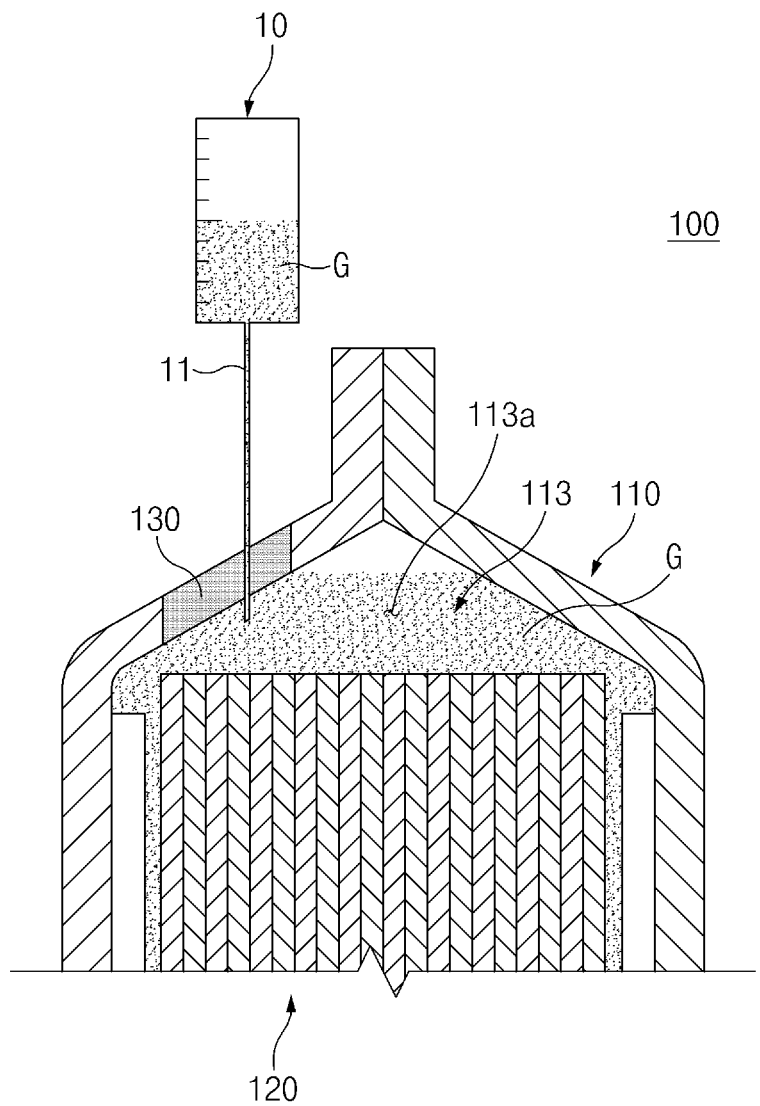
FIG. 6 is a view illustrating an example of an injection preparation process and an injection process in a method for supplementing an electrolyte of a secondary battery according to an embodiment of the present invention.
Figure 7:
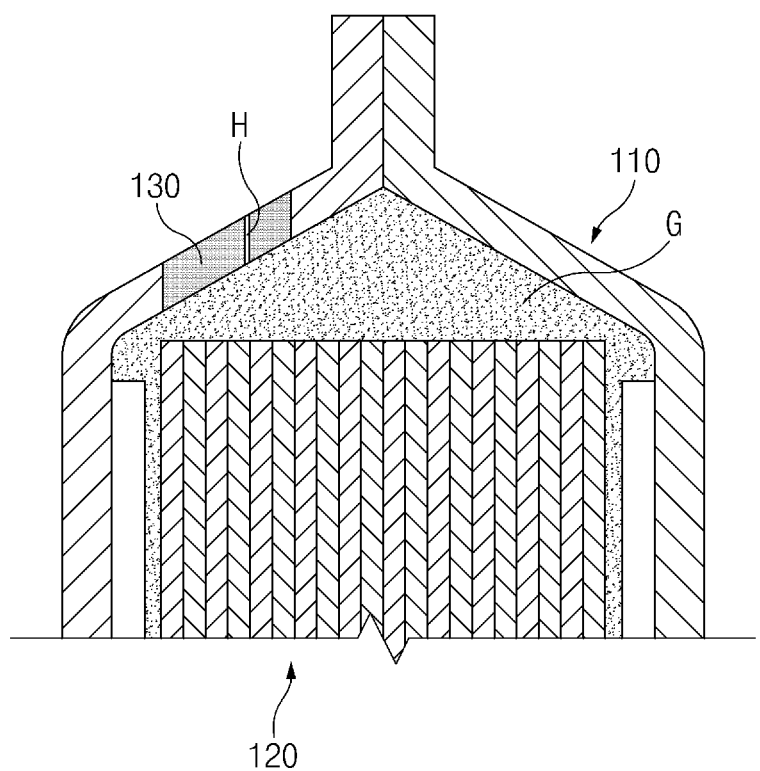
FIG. 7 is a view illustrating an example of a state in which the injection needle is removed after the electrolyte is injected in the method for supplementing the electrolyte according to an embodiment of the present invention.
Figure 8:
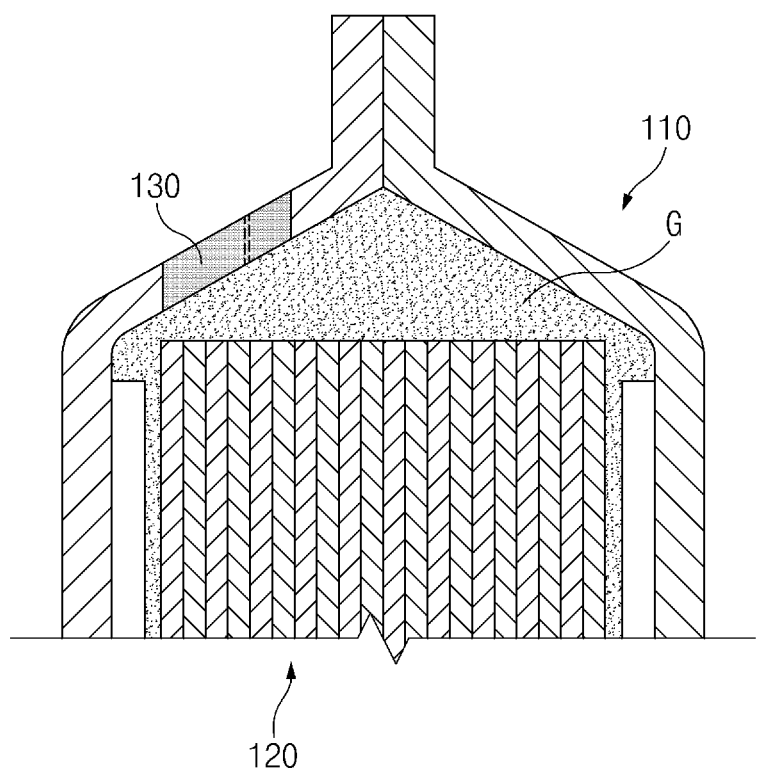
FIG. 8 is a view illustrating an example of a sealing process in the method for supplementing the electrolyte according to an embodiment of the present invention.

FIG. 6 is a view illustrating an example of an injection preparation process and an injection process in a method for supplementing an electrolyte of a secondary battery according to an embodiment of the present invention, FIG. 7 is a view illustrating an example of a state in which the injection needle is removed after the electrolyte is injected in the method for supplementing the electrolyte according to an embodiment of the present invention, and FIG. 8 is a view illustrating an example of a sealing process in the method for supplementing the electrolyte according to an embodiment of the present invention.

Hereinafter, a method for supplementing an electrolyte of a secondary battery according to an embodiment of the present invention will be described in more detail with reference to FIGS. 6 to 10.

Referring to FIGS. 6 to 8, the method for supplementing the electrolyte of the secondary battery according to an embodiment of the present invention comprises an injection preparation process, an injection process, and a sealing process. Also, the method for supplementing the electrolyte of the secondary battery according to an embodiment of the present invention may further comprise a tape attaching process.

In more detail, referring to FIG. 6, in the injection preparation process, an injection needle 11 passes through a sealing member 130 for additionally injecting the electrolyte G, which passes through the inside and outside of a battery case 110 and is formed on a portion of a battery case 110 so that the injection needle 11 passes through a penetrated portion of the sealing member to inject the electrolyte G.

Also, in the injection preparation process, the injection needle 11 may pass through the sealing member 130 for additionally injecting the electrolyte G so that the electrolyte G is additionally injected into a space part 113a, in which the electrode assembly 120 is not disposed in an accommodation part 113 of the battery case 110, through the sealing member 130 for additionally injecting the electrolyte G.

Furthermore, in the injection preparation process, heat may be applied to the sealing member 130 for additionally injecting the electrolyte G, which is provided as a thermoplastic member, so that the injection needle 11 easily passes through the sealing member 130. As a result, the sealing member 130 may change in fluidity so that the injection needle 11 passes therethrough.

In the injection process, the electrolyte G may be additionally injected into the accommodation part 113 of the battery case 110, in which the electrode assembly 120 and the electrolyte G are accommodated, through the injection needle 11.

Here, in the injection process, for example, the electrolyte G may be accommodated in the injection needle 10 and then be additionally injected into the accommodation part 113 of the battery case 110 through the injection needle 11 passing through the sealing member 130 for additionally injecting the electrolyte G.

Referring to FIG. 7, in the sealing process, after the injection needle 11 is removed from the sealing member 130 for additionally injecting the electrolyte G, a through-hole H formed by the penetration of the injection needle 11 may be sealed.

Also, referring to FIG. 8, in the sealing process, heat is applied to the sealing member 130 for additionally injecting the electrolyte G, which is provided as, for example, the thermoplastic member to seal the portion of the sealing member 130, through which the injection needle passes. Here, in the sealing process, heat is applied to the sealing member 130 for additionally injecting the electrolyte G, which is made of a silicone sealant, to seal the penetrated portion.

Figure 9:
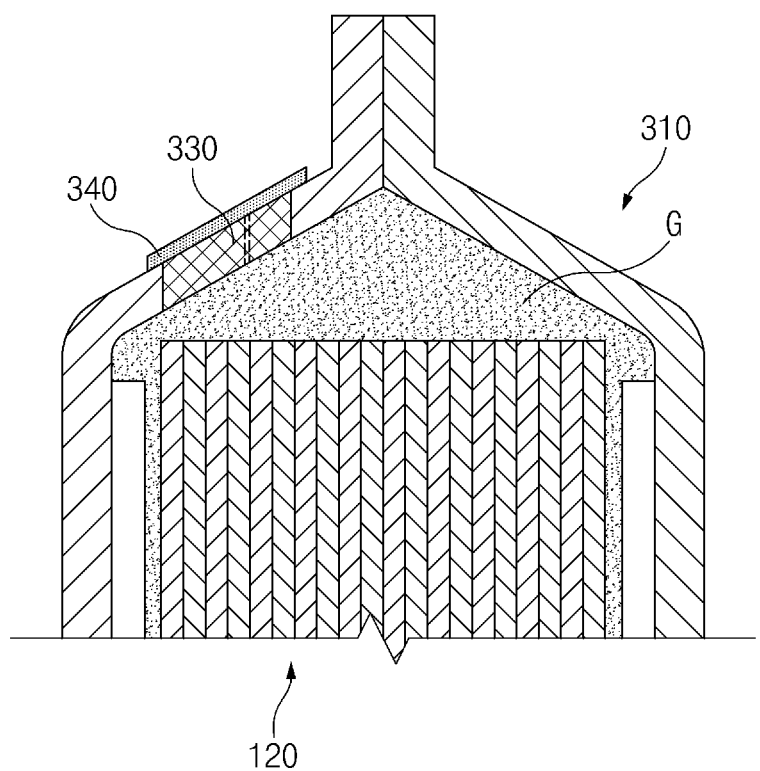
FIG. 9 is a view illustrating another example of the sealing process in the method for supplementing the electrolyte according to an embodiment of the present invention.

FIG. 9 is a view illustrating another example of the sealing process in the method for supplementing the electrolyte according to an embodiment of the present invention.

In addition, referring to FIG. 9, for another example, in the sealing process, the sealing member 330 for additionally injecting the electrolyte G may be provided as a highly contractive member. Thus, when the injection needle is removed from the sealing member 330 for additionally injecting the electrolyte G, the portion of the sealing member 330, through which the injection needle passes, may be sealed by self-contracting force of the highly contractive member. Here, the highly contractive member may be made of, for example, silicone rubber.

Here, in the tape attaching process, a sealing tape 340 may be attached to an outer surface of the sealing member 330 for additionally injecting the electrolyte G to additionally seal the injection portion that is sealed by the self-contracting force of the highly contractive member. Here, the sealing tape 340 may be provided as a Kapton tape.

Here, in the tap attaching process, the sealing tape 340 may be attached before the injection preparation process. In the injection preparation process, a portion or the whole of the sealing tape 340 may be separated from the sealing member 330 for additionally injecting the electrolyte G, and then, the injection needle may pass through the sealing member 330 for additionally injecting the electrolyte G. In the sealing process, the injection needle may be removed from the sealing member 330 for additionally injecting the electrolyte G, and then, a portion of the sealing tape 340, which is separated from the sealing member 330 for additionally injecting the electrolyte G, may be attached again to the sealing member 330 for additionally injecting the electrolyte G to additionally seal the sealing member 330.

Figure 10:
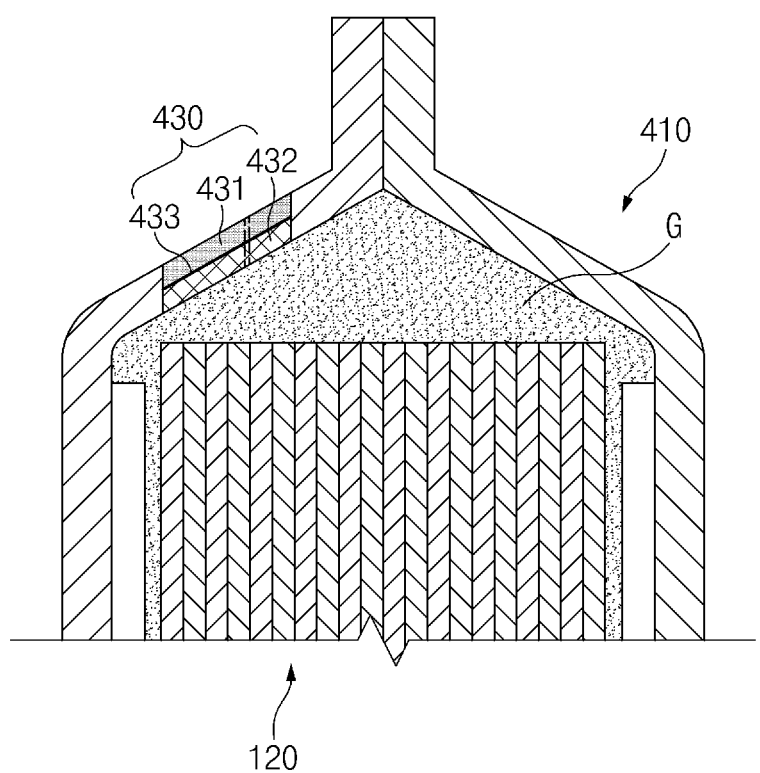
FIG. 10 is a view illustrating further another example of the sealing process in the method for supplementing the electrolyte according to an embodiment of the present invention.

FIG. 10 is a view illustrating further another example of the sealing process in the method for supplementing the electrolyte according to an embodiment of the present invention.

Also, referring to FIG. 10, for further another example, in the sealing process, an inner part 432 of the sealing member 430 for additionally injecting the electrolyte G, which is made of the silicone rubber, with respect to the accommodation part 413 of the battery case may seal the portion, through which the injection needle passes, by the self-contracting force of the silicon rubber when the injection needle is removed. In addition, heat may be applied to an outer part 431 of the sealing member 430 for additionally injecting the electrolyte G, which is made of the silicone sealant, to seal the penetrated portion of the sealing member 430.

Here, in the sealing process, heat transfer between the outer part 431 and the inner part 432 may be blocked by a heat dissipation member 433 disposed between the outer part 431 and the inner part 432 of the sealing member 430 for additionally injecting the electrolyte G. Here, the heat dissipation member 433 may be provided as, for example, a Kapton tape.

While the present invention has been particularly shown and described with reference to exemplary embodiments thereof, this is for the purpose of specifically describing the present invention, and thus, the secondary battery and the method for supplementing the electrolyte of the secondary battery according to the present invention are not limited thereto. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   a battery case comprising an accommodation part accommodating an electrode and an electrolyte therein; and
   a sealing member for additionally injecting the electrolyte, which is disposed on a portion of the battery case to additionally inject the electrolyte into the accommodation part of the battery case and seals an injection portion,
   wherein the sealing member for additionally injecting the electrolyte passes through the inside and outside of the battery case so that the electrolyte is injected through a penetrated portion of the sealing member,
   wherein the sealing member for additionally injecting the electrolyte is provided as a thermoplastic member so that the injection portion is sealed by applying heat, and
   wherein the thermoplastic member is made of a silicone sealant,
   wherein, in the sealing member for additionally injecting the electrolyte, an outer part of the sealing member with respect to the accommodation part of the battery case is made of the silicone sealant to seal the injection portion by applying heat, and an inner part of the sealing member is made of silicone rubber to seal the injection portion through self-contracting force thereof.

2. The secondary battery of claim 1, wherein the sealing member for additionally injecting the electrolyte further comprises a heat dissipation member disposed between the outer part and the inner part to block heat transfer between the outer part and the inner part.

3. The secondary battery of claim 1, wherein the battery case further comprises a protrusion end protruding from each of inner and outer surfaces of the battery case in a direction of the sealing member for additionally injecting the electrolyte to support the sealing member for additionally injecting the electrolyte, thereby preventing the sealing member from being separated from the battery case.

4. A method for supplementing an electrolyte of a secondary battery, the method comprising:
   an injection preparation process of allowing an injection needle to pass through a sealing member for additionally injecting the electrolyte, which passes through the inside and outside of a battery case and is formed on a portion of the battery case so that the injection needle passes through a penetrated portion of the sealing member to inject the electrolyte;
   an injection process of additionally injecting the electrolyte into an accommodation part of the battery case, in which an electrode assembly and the electrolyte are accommodated, through the injection needle; and a sealing process of sealing the portion of the sealing member, through which the injection needle passes, after the injection needle is removed from the sealing member for additionally injecting the electrolyte, wherein, in the injection preparation process, the injection needle passes through the sealing member for additionally injecting the electrolyte after heat is applied to the sealing member provided as a thermoplastic member so that the injection needle easily passes through the sealing member, and in sealing process, heat is applied to the sealing member for additionally injecting the electrolyte provided as a thermoplastic member to seal the portion of the sealing member, through which the injection needle passes.

5. The method of claim 4, wherein, in the sealing process, heat is applied to the sealing member for additionally injecting the electrolyte made of a silicone sealant to seal the penetrated portion.

6. The method of claim 4, wherein, in the sealing process, the sealing member for additionally injecting the electrolyte is made of silicone rubber to seal the portion of the sealing member, through which the injection needle passes, by self-contracting force of the silicone rubber when the injection needle is removed from the sealing member for additionally injecting the electrolyte.

7. The method of claim 5, further comprising a tape attaching process of attaching a sealing tape to an outer surface of the sealing member for additionally injecting the electrolyte.

8. The method of claim 7, wherein, in the tape attaching process, the sealing tape is attached before the injection preparation process, in the injection preparation process, the injection needle passes through the sealing member for additionally injecting the electrolyte after a portion or the whole of the sealing tape is separated from the sealing member for additionally injecting the electrolyte, and in the sealing process, the portion of the sealing tape, which is separated from the sealing member for additionally injecting the electrolyte, is attached again to the sealing member for additionally injecting the electrolyte to additionally seal the sealing member after the injection needle is removed from the sealing member for additionally injecting the electrolyte.

9. The method of claim 4, wherein, in the sealing process, an inner part of the sealing member for additionally injecting the electrolyte, which is made of silicone rubber, with respect to the accommodation part of the battery case seals the portion, through which the injection needle passes, by self-contracting force of the silicone rubber when the injection needle is removed, and heat is applied to an outer part of the sealing member for additionally injecting the electrolyte, which is made of a silicone sealant, to seal the penetrated portion of the sealing member.

10. The method of claim 6, further comprising a tape attaching process of attaching a sealing tape to an outer surface of the sealing member for additionally injecting the electrolyte.

11. The method of claim 10, wherein, in the tape attaching process, the sealing tape is attached before the injection preparation process, in the injection preparation process, the injection needle passes through the sealing member for additionally injecting the electrolyte after a portion or the whole of the sealing tape is separated from the sealing member for additionally injecting the electrolyte, and in the sealing process, the portion of the sealing tape, which is separated from the sealing member for additionally injecting the electrolyte, is attached again to the sealing member for additionally injecting the electrolyte to additionally seal the sealing member after the injection needle is removed from the sealing member for additionally injecting the electrolyte.

\* \* \* \* \*